(12) United States Patent
Kim

(10) Patent No.: US 7,364,785 B1
(45) Date of Patent: Apr. 29, 2008

(54) LAYERED FILM SHEET FOR COATING

(75) Inventor: Yang-Pioung Kim, Seoul (KR)

(73) Assignee: GMP Co., Ltd., Kyonggi (KR)

( * ) Notice: Subject to any disclaimer, the term of this patent is extended or adjusted under 35 U.S.C. 154(b) by 0 days.

(21) Appl. No.: 09/579,235

(22) Filed: May 30, 2000

(30) Foreign Application Priority Data

Mar. 15, 2000 (KR) ................................ 2000-13209

(51) Int. Cl.
*B32B 3/00* (2006.01)
(52) U.S. Cl. ........................ 428/156; 428/480; 428/483; 428/500; 428/515; 428/516; 428/518; 428/523; 428/520; 428/522
(58) Field of Classification Search ................ 428/480, 428/463, 500, 515, 516, 523, 520, 522, 156
See application file for complete search history.

(56) References Cited

U.S. PATENT DOCUMENTS 5,209,959 A * 5/1993 McNaul et al. ................ 428/40
5,567,533 A * 10/1996 Toney et al. .............. 428/475.5
5,780,147 A * 7/1998 Sugahara et al. ........... 428/332

* cited by examiner

*Primary Examiner*—Blaine Copenheaver
*Assistant Examiner*—Hai Vo
(74) *Attorney, Agent, or Firm*—Egbert Law Offices

(57) ABSTRACT

A layered film sheet which can coat a sheet-like subject and is folded to coat the subject. In the folded, layered film sheet, an embossed polyvinyl chloride film exists as an outermost layer, an EVA film serves as an innermost layer in direct contact with the subject and a low density polyethylene film, an EVA film and a polyester film are intermediately inserted therebetween. The LDPE film and the polyester film are bonded to the outermost layer and the innermost layer via water-miscible acryl adhesives respectively. The innermost layer is softened and made adhesive at low temperatures and thus, the total coating process can be conducted at decreased temperatures so that the outermost PVC film can be expressed in effective embossed patterns.

1 Claim, 2 Drawing Sheets

LAYERED FILM SHEET FOR COATING

BACKGROUND OF THE INVENTION

1. Field of the Invention

The present invention relates, in general, to a layered film sheet for coating a sheet-like subject and, more particularly, to a layered film sheet which can clearly preserve a sheet-like subject for a semipermanent period as an elegant and archaic expression.

2. Description of the Related Art

In order to protect and/or decorate a sheet-like subject with its appearance being visible, a vacuum lamonix process has been conventionally used. According to this process, a piece of cloth or an embossed plate is applied over a folded polyethylene film between which the subject, for example, a photograph, a print, a picture, etc., is inserted, and then pressurized at an elevated temperature under a vacuum condition, so as to allow the subject to be embossed and tightly shielded. However, this conventional laminating process is very complicated and inefficient. In addition, polyethylene cannot create an archaic and elegant expression owing to its luster or gloss.

Another method for the coating of a sheet-like subject is to use a film-transferable, laminating sheet in which a polyethylene liquid type film is formed on a high-melting temperature thermoplastic film of high releasablility or on a sheet of paper which has experienced a release treatment. Such a sheet, however, cannot provide a high quality texture because of its luster. It is poor in the adhesion to subjects and in durability because it is easily torn owing to its thin and weak coating film.

Further, a luminating sheet has been developed in which a polyester film overlays a polyethylene film with the aim of reinforcing the weak physical properties of polyethylene. The sheet which has a polyester film as the outmost layer suffers from a disadvantage of being unable to obtain a decoration effect because the polyester film is virtually impossible to emboss and readily damaged along its folded line.

BRIEF SUMMARY OF THE INVENTION

Therefore, it is an object of the present invention to overcome the above problems encountered in the prior art and to provide a layered film sheet which can coat a sheet-like subject with elegant and archaic expression.

It is another object of the present invention to provide a layered film sheet which can preserve a sheet-like subject for a semipermanent period.

It is a further object of the present invention to provide a layered film sheet which does not droop and cling to rollers during coating.

Based on the present invention, the above objects could be achieved by a layered film sheet for coating a sheet-like subject, in which an embossed polyvinyl chloride film exists as an outermost layer and an EVA film serves as an innermost layer to be in direct contact with the subject when the film sheet is folded to coat the subject. There is a low density polyethylene film, an EVA film and a polyester film intermediately inserted between the two layers, in due order from the outermost to the innermost layer, the LDPE film being bonded to the outermost layer via a water-miscible acryl-based adhesive, and the polyester film being bonded to the innermost layer via a water-miscible acryl-based adhesive.

In the layered film sheet for coating, the innermost layer is softened and made adhesive at low temperatures and thus, the total coating process can be conducted at decreased temperatures so that the outermost PVC film can be expressed in effective embossed patterns. Also, such low-temperature coating prevents the heat deterioration of the subjects, such as pictures, prints, and paleography. The low coating temperature can afford a clear product which is free of speckles resulting from the spreading or running of gelatin on a photograph or ink on a print when it is melted at high coating temperatures. In addition, a subject, when being coated with the layered film sheet, can be semipermanently preserved due to the excellent air tightness of the layered film sheet. Moreover, the employment of the dull and embossed PVC film allows the layered film sheet to be of high-toned and archaic texture.

BRIEF DESCRIPTION OF THE DRAWINGS

The above and other objects, features and other advantages of the present invention will be more clearly understood from the following detailed description taken in conjunction with the accompanying drawings.

DETAILED DESCRIPTION OF THE INVENTION

Figure 1:
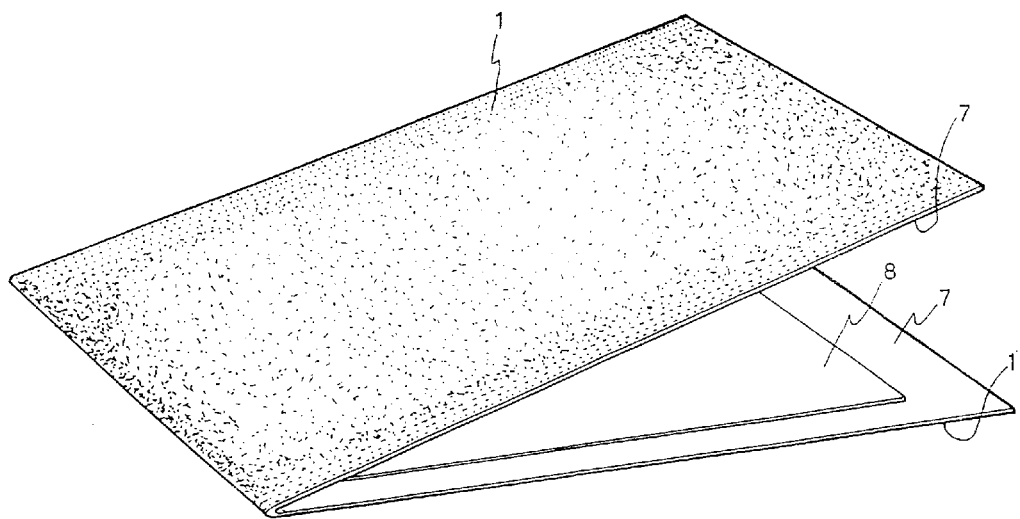
FIG. 1 is a perspective view showing the coating of a sheet-like subject with the layered film sheet of the present invention.

The present invention is directed to a layered film sheet for coating sheet-like subjects. With reference to FIG. 1, there is shown the coating of a sheet-like subject with the layered film sheet of the present invention. As seen in FIG. 1, a sheet-like subject 8, such as a photograph, a picture, a piece of cloth, a print, etc., is placed on one half of one surface of the layered film sheet and the layered film sheet is folded for the other half to cover the exposed face of the subject. Accordingly, the surfaces of the subject are brought into direct contact with only one surface (represented by reference numeral 7 in FIG. 1) of the layered film sheet. Meanwhile, the other surface (represented by reference numeral 1 in FIG. 1) of the layered film sheet exclusively composes the surface of the resultant coating.

In accordance with the present invention, the layered film sheet has a multi-layer structure of thermoplastic thin films, in which an embossed PVC film 100 microns thick exists as an outermost layer and an EVA film with a thickness of 25-30 microns serves as an innermost layer to be in direct contact with a subject. There is a low density polyethylene film (hereinafter referred to as "LDPE"), an EVA film and a polyester film intermediately inserted in due order from the outermost to the innermost layer, the LDPE film 20 microns thick being bonded to the outermost layer via a water-miscible acryl-based adhesive, and the polyester film 11-12 microns thick being bonded to the innermost layer via a water-miscible acryl-based adhesive.

Figure 2:
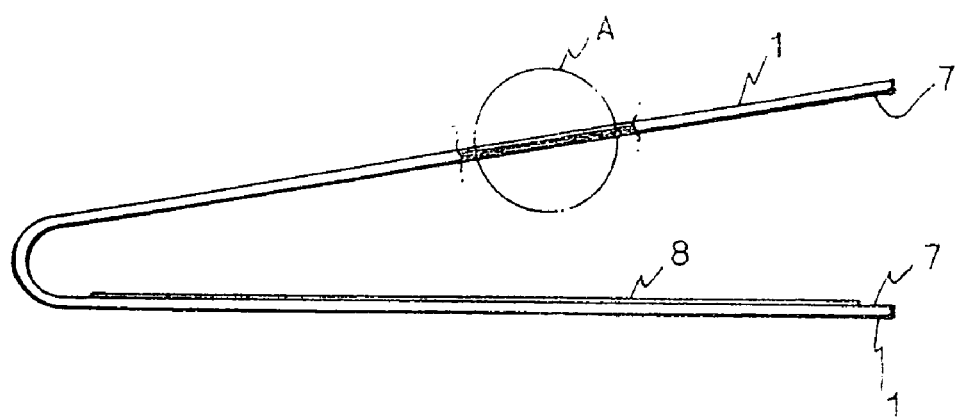
FIG. 2 is a cross sectional view showing the coating of a sheet-like subject with the layered film sheet of the present invention.
Figure 3:
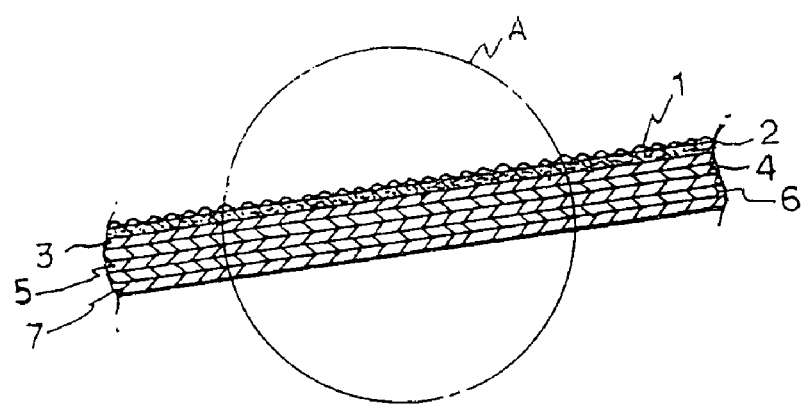
FIG. 3 is a partially enlarged view of part A of FIG. 2.

With reference to FIG. 2, there is a cross-section in which the layered film sheet of the present invention is being folded to coat a sheet-like subject 8. A detail structure of the layered film sheet of the present invention is shown in a partially enlarged view of FIG. 3, taken from part A of FIG. 1. As seen, the multi-layered structure of the present invention comprises, in the layered order from top to bottom, a 100 micron-thick embossed PVC film layer 1, a water-miscible acryl adhesive layer 2, a 20 micron-thick LDPE film layer 3, a 20 micron-thick EVA film layer 4, a 11-12 micron-thick polyester film layer 5, a water-miscible acryl adhesive layer 6, and a 25-30 micron EVA film layer 7.

For the construction of this multi-layer structure, first, a molten EVA resin is spread and cured on one side of a polyester film by T-die coating. The same process is also true of the formation of a LDPE layer on the resulting EVA coating. Separately, an acryl adhesive is applied on one side of a PVC film by roller coating. To this bi-layer structure, the above LDPE-EVA-PET structure is bonded by pressurizing with a pair of engaged rollers in such a way that the adhesive layer faces the LDPE layer. On the exposed side of the PET layer in the resulting quintuple structure, a water-miscible acryl adhesive layer is formed by roller coating and dried to some degree, followed by applying a molten EVA resin on the water-miscible acryl adhesive layer through T-die coating by means of a coating roller. The water-miscible acryl adhesive is prepared from a composition consisting of 1:3:1 ratios of solid content:water:methanol. Although no heat is applied when the adhesive is coated, it is spontaneously cured by the heat which is used when other layers are laminated.

As mentioned above, the EVA and LDPE film layers of the layered film sheet of the present invention are not recruited as ready-made films, but formed from solutions of low melting point resins by T-die coating. EVA, if not exhibiting adhesiveness at low temperatures, is a typical hot melt resin with low melting and softening temperatures, which can be tackified by heat and/or pressure.

Useful for the present invention is a softened PVC film which is modified by the addition of a plasticizer for the embossing and laminating purpose of the present invention. Its surface may be converted for being lustered into being dull by a provision of various senses to the touch and/or the sight, such as canvas texture, fine texture, sand patterns, etc.

Generally, PVC films are duller than are polyethylene films or polyester films. In the present invention, the PVC film is made duller by use of the additive and subjected to embossing, so as to produce a higher quality archaic and elegant expression.

In addition to the delustering function, the plasticizer plays an important role in coating a sheet-like subject with the layered film sheet of the present invention. The subject, for example, a photograph or a print, is placed between the doubled sheet which is folded in such a way that the top PVC layer is externally exposed with an inside existence of the bottom EVA layer. Subsequently, the folded sheet comprising the subject between the doubled facing EVA layers is allowed to pass through a pair of hot engaged rollers in a laminator to give a laminated product. In this regard, the laminating temperature is around 110° C. Since the folded sheet is transiently passed through the roller at this temperature and the PVC surface is embossed in advance of the complete gelling of the plasticizer added, the embossed patterns do not fade out, but remain unmelted, thereby obtaining a maximum embossing effect.

The innermost EVA layer, which is brought into direct contact with the subject after the coating, is softened in the temperature range of 40-50° C. by the heat conducted from the surface layer and by the pressure of the engaged rollers and thus adheres to the subject.

When the innermost layer becomes adhesive at high temperatures, resin ink or gelatin, if present on a subject such as a print or a photograph, may be softened or melted to slightly run, thereby spoiling the subject. Accordingly, the innermost layer is preferably prepared from an EVA resin which is sticky even at low temperatures.

The recruitment of the soft PVC film as a surface layer enjoys advantages of obtaining an extremely high embossing effect and of providing archaic and elegant texture to the sight by virtue of its lower gloss than other resin films.

It is virtually impossible to emboss polyester films. It is possible to emboss LDPE films, but while the LDPE films pass through the rollers at such a high temperature, the embossed patterns on LDPE films are melted and can become fade-outs. When this phenomenon is taken into account, the outermost layer is most preferably prepared from PVC.

As for the acryl adhesive, it is applied where two layers, which are poor in reciprocal adhesiveness, are bonded to each other. That is, the adhesive is inserted between the outermost PVC film and the polyethylene film and between the polyester film and the innermost EVA film. In addition, the adhesive layer between the outermost PVC film and the LDPE film functions to reinforce the PVC film which sustains most seriously the shearing force from the engaged rollers while the adhesive layer between the innermost EVA film and the polyester film maintains the EVA layer in its integrity.

In the meanwhile, the intermediate LDPE film and EVA layers are so flexible that they can be buffed to prevent the deformation or twisting of the sheet, which is apt to occur because of the difference in the coefficient of thermal expansion between the different material layers, the innermost layer and the outermost layer. The intermediate polyester film layer guarantees the sheet to be dimensionally stable by virtue of its excellent thermal resistance. Further, the polyester film layer remains stiff even when the other films are softened by the heat during the coating, so that it can eliminate the problems occurring in a laminator in the absence of such stiffness, for example, a sheet's drooping and clinging to rollers.

Consequently, layered film sheets for coating sheet-like subjects must be constructed with deliberate consideration of the softening or melting points of the films to be laminated, the adhesiveness among them, the characteristics and functionality the films have when being heated, the reciprocal complementarity among the films, and the relationship to the subject.

In the layered film sheet for coating, in accordance with the present invention, as described hereinbefore, the innermost layer, which is brought into direct contact with a subject, is softened and made adhesive at low temperatures and thus, a decrease can be brought about in the total coating temperature, enabling the outermost PVC film to be expressed in effective embossed patterns. In addition, such low-temperature coating prevents the subjects such as pictures, prints, paleography, etc., from being deteriorated by heat. For instance, the low temperature of the coating can produce a clear product which is free of speckles which result from the spreading or running of gelatin on a photograph or ink on a print when it is melted at high coating temperatures. Further, a subject, when being coated with the layered film sheet of the present invention, can be semipermanently preserved due to the excellent air tightness of the layered film sheet. Moreover, the employment of the dull and embossed PVC film allows the layered film sheet of the present invention to be of high-toned and archaic texture.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced and otherwise than as specifically described.

I claim:

1. A layered film article comprising:
   a subject sheet;
   an embossed polyvinyl chloride film sheet defining an outermost layer;
   an ethylene vinyl acetate sheet defining an innermost layer, said ethylene vinyl acetate sheet being in direct contact with said subject sheet, said outermost layer being folded over and coating said subject sheet;
   a low-density polyethylene film positioned against and bonded to said outermost layer by a water-miscible acryl-based adhesive;
   an ethylene vinyl acetate film positioned against a surface of said low-density polyethylene film opposite said outermost layer; and
   a polyester film positioned against a surface of said ethylene vinyl acetate film opposite said low-density polyethylene film, said polyester film being bonded to said innermost layer by a water-miscible acryl-based adhesive.

* * * * *